July 19, 1966 D. W. M. COPLEY 3,261,746
LIQUID ABSORBENT AND VAPOR RELEASANT BLOCK
Filed Dec. 5, 1962
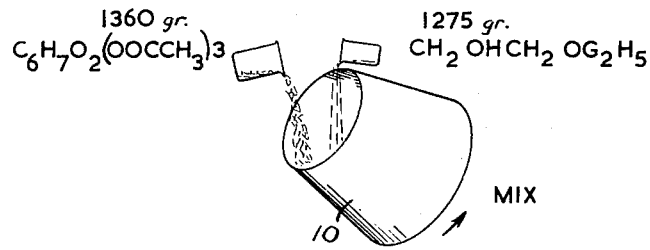
STAGE 1
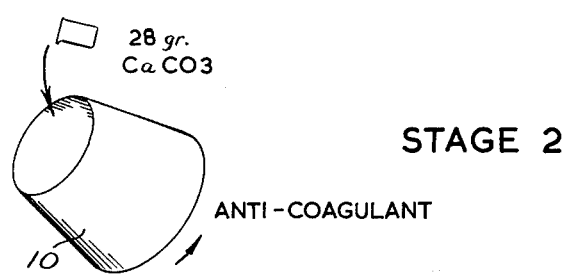
STAGE 2
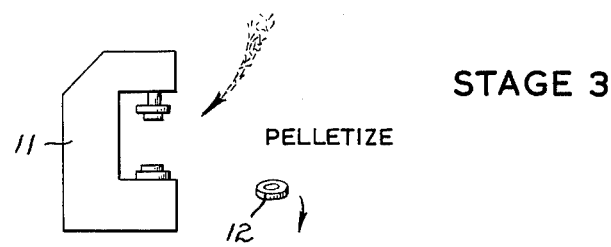
STAGE 3
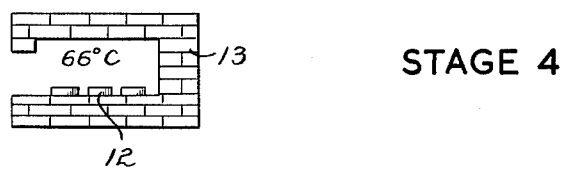
STAGE 4
STAGE 5
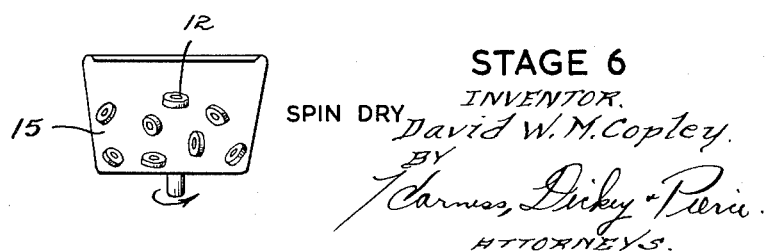
STAGE 6
INVENTOR.
David W. M. Copley
BY
Carnes, Dickey & Pierce
ATTORNEYS.

3,261,746
LIQUID ABSORBENT AND VAPOR RELEASANT BLOCK

David W. M. Copley, 3 Attunga Ave., Golflands, South Australia, Australia
Filed Dec. 5, 1962, Ser. No. 242,422
Claims priority, application Australia, Dec. 11, 1961, 12,240/61; Feb. 28, 1962, 14,900/62
3 Claims. (Cl. 167—42)

This invention relates to a liquid absorbent and vapour releasant material suitable for the dispensing of, for example, deodorant perfumes or insect repellents.

It has been proposed heretofore to dispense certain liquids in vapour form by utilising wick means. For example, it has been proposed to immerse a wick in a bottle of liquid, or to have a felt pad and means to apply liquid to the felt pad. Such arrangements however suffer with the disability firstly in that the liquid is more difficult to pack than say, a solid block, and secondly in that the felt pad releases a large volume of vapour quickly but the rate of release rapidly diminishes so that insufficient vapour is available after a period of a number of hours unless means are provided for replenishing the supply of liquid to the felt pad. Furthermore it is found that felt tends to become damaged under certain tropical conditions.

With the object of improving the dispensing of volatile liquids in vapour form, this invention in its simplest form may be said to consist of a liquid absorbent and vapour releasant material which comprises a plurality of granules with a mean minimum dimension of not less than 0.020 inch retained together to form a mass with from 2% to 20% porosity, the granules consisting of a material which rapidly absorbs the volatile liquid and slowly releases the absorbed liquid in vapour form.

It is well known that certain solid substances will absorb volatile liquids, different substances of course being used for different liquids. In the case of both perfumes and insect repellents some difficulty is encountered in obtaining a material suitable for the absorption of the liquid and the releasing of the absorbed liquid at the desired rate, and a further object of this invention is to provide a material which can absorb quantities of volatile liquids at a fast rate but release the absorbed liquid in vapour form at a slow rate.

A still further object of this invention is to provide a method whereby a convenient block of such material can be formed.

An embodiment of the invention is described hereunder in some detail, and the method according to the embodiment is illustrated herein with reference to the accompanying drawings.

According to this embodiment, 1360 grams (3 lbs.) of cellulose acetate, $C_6H_7O_2(OOCCH_3)_3$ are mixed with 1275 grams (45 ozs.) of ethylene glycol monoethyl ether ($CH_2OHCH_2OC_2H_5$) in a rotary mixer. The cellulose acetate is in granular form, and in this embodiment the grains range from 1 to 2 millimeters in diameter and from 1 and 1½ millimeters to 4½ millimeters in length. However the ranges of quantities of ethylene glycol monoethyl ether may vary considerably from 30 grams to 1400 grams with the necessary changes in the time of mixing and pressure. Similarly the grain sizes of the cellulose acetate granules can vary from 0.5 millimeter to 4.0 millimeters mean minimum dimension, it being preferred however that they be in the form of short extruded rods.

The addition of the ethylene glycol monoethyl ether is necessary to soften and swell the acetate so that in further processing it can be compressed, bonding the granules into a porous block which is capable of absorbing large amounts of volatile liquids, for example, oil based perfumes for the deodorant characteristics of the final product or dimethyl phthalate for insect repellent purposes.

The cellulose acetate is mixed in the rotary mixer 10 with the ethylene glycol monoethyl ether for a period of 15 minutes, and at the end of this period, 28 grams of calcium carbonate $CaCO_3$ is added for the purpose of preventing coagulation of the mix, and mixing is continued in the rotary mixer 10 for a further period of 5 minutes. At this stage the cellulose acetate is still in the form of free flowing granules, and these are transferred to the third stage, that is, they are pelleted or tableted on a standard pelleting press 11 into the desired shape for the block 12. The quantity of calcium carbonate may vary from 20 to 400 grams, and will be variable to some extent in accordance with the amount of ethylene glycol monoethyl ether which is used.

It is found that the porosity of the block 12 when formed according to the above method varies from 3% to 10%, and it is found that the vapour releasant material cannot be absorbed in useful quantities if the porosity is less than 2%, while it is found that from a practical point of view it is difficult to achieve cohesion if porosities above 20% are attempted in the press.

The pressure applied within the press is 500 kilogrammes per square centimeter, and is necessarily within the range of from 300 kilogrammes per square centimeter to 4000 kilogrammes per square centimeter. Pressures below 300 kilogrammes per square centimeter are not sufficient to pelletize the cellulose acetate while pressures above 4000 kilogrammes per square centimeter result in a porosity which is insufficient to achieve the desired rate of release of vapour from the liquid absorbed by the block.

After the blocks 12 have been pelletized, they are dried at a temperature of about 66° C. and not above 90° C. in a drying oven 13, and after drying they are then immersed in a volatile liquid 14. In this embodiment the volatile liquid 14 consists of a mixture of oil based perfumes and dimethyl phthalate, so that the block will have the dual function of deodorizing and repelling insects.

After the blocks 12 have been immersed in the liquid 14, they are then spin dried in the spin dryer 15 to remove excess surface moisture. After spin drying the blocks still retain between 10% and 15% of their weight in perfume.

The quantity of calcium carbonate which is used before pelletizing can if desired be varied upwardly above the 28 grams to as much as 500 grams without necessarily destroying the characteristics of the final block. However it is desired that the range should not extend very far below the 28 grams, this being considered a necessary minimum to prevent coagulation of the cellulose acetate granules so that they are easily handled in the pelleting press 11.

It is found that the cellulose acetate treated as described above has the desired characteristics for rapidly absorbing liquid which is quickly taken into the voids between the pressed granules, the liquid if of a volatile nature having its molecules loosely attached to the molecules of the cellulose acetate. This results in a slight physical growth of the block 12. Most perfumes and insect repellents are readily absorbed in this manner, but are given off slowly in vapour form over a period of time. Thus for example a block constructed according to the above embodiment 2 inches in diameter and ½ an inch in thickness is found to still yield noticeable quantities of perfume or insect repellent after a week's continuous exposure under average ambient conditions. With some perfumes, noticeable quantities are still yielded after more than twelve month's continuous exposure.

It is found that the cellulose acetate when produced according to this invention is slightly hygroscopic, and its hygroscopic tendencies assist in the repression of rapid evaporation of perfume from the surface of the block due to the partial pressure imposed by the moisture absorbed from the atmosphere.

It is not necessary that the block be formed in accordance with the above embodiment, and as a further example of a satisfactory block which is formed according to a further process, which is not however illustrated in the accompanying drawings, cellulose acetate grains of mean minimum dimension between 0.5 and 4.0 millimeters are mixed in a rotary mixer with ethylene glycol monoethyl ether in the proportions of 2 parts cellulose acetate to 1 part of ethylene glycol by weight. The addition of the ethylene glycol ether again softens and swells the acetate granules so that in further processing it can be compressed, bonding the granules into a porous block which is capable of absorbing large amounts of oil based perfume. During the mixing, the ethylene glycol monoethyl ether is added in three stages, equal amounts being added in each stage, and at intervals of one hour whilst the mixing continues. This assists in the absorbing of the ethylene glycol monoethyl ether and at the same time prevents coagulation of the mix. At the end of the three hour period the mix is in a condition where it is dry but will not coagulate when squeezed in the hand, and in this condition it is ready for feeding into a special purpose machine wherein the granules are cold-formed into the desired shape under a pressure of 500 kilogrammes per square centimeter. The block is then air-dried for a period of at least 120 hours and is immersed in the perfume and then drained before use.

It will immediately be apparent that this second process for the production of blocks is necessarily slower than the first process, but removes the need for the calcium carbonate and also for the spin drying and oven drying indicated in the first embodiment.

According to still further variations, thermoplastic material such as polystyrene, acrylic, or cellulose acetate are mixed with suitable solvents in quantities which soften but do not dissolve the thermoplastic material. For example, 1360 grams (3 lbs.) of cellulose acetate are mixed with 5 ozs. of ethylene glycol monoethyl ether $$(C_4H_{10}O_2)CH_2OHCH_2OC_2H_5$$

or benzyl alcohol

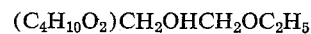
$(C_7H_8O)\overline{CH:CHCH:CHCH:C}CH_2OH$ or Cellosolve acetate $$(C_6H_{12}O_3)CH_3COO(CH_2)_2OCH_2CH_3$$

As a further alternative, 1360 grams (3 lbs.) of polystyrene are mixed with 5 ozs. of benzyl alcohol

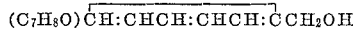
$(C_7H_8O)\overline{CH:CHCH:CHCH:C}CH_2OH$ or methyl amyl acetate $$(C_8H_{16}O_2)CH_3COOCH(CH_3)CH_2CH(CH_3)_2$$

or dimethyl phthalate $$(C_{10}H_{10}O_4)CH_3OOCC:CHCH:CHCH:CCOOCH_3$$

As a still further alternative, 1360 grams (3 lbs.) of acrylic are mixed with 5 ozs. of benzyl alcohol

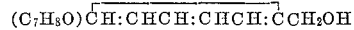
$(C_7H_8O)\overline{CH:CHCH:CHCH:C}CH_2OH$ or Cellosolve acetate $$(C_6H_{12}O_3)CH_3COO(CH_2)_2OCH_2CH_3$$

or methyl amyl acetate $$(C_8H_{16}O_2)CH_3COOCH(CH_3)CH_2CH(CH_3)_2$$

The blocks so formed using dimethyl phthalate $$(C_{10}H_{10}O_4)CH_3OOCC:CHCH:CHCH:CCOOCH_3$$

as the solvent have excellent insect repellent properties and may be used as insect repellent blocks.

Not all thermoplastic materials are suitable for use in this invention, and for example attempts to use nylon, polyethylene or polyvinyl chloride have proved unsuccessful. The following chart indicates the more useful materials:

| Material | Dimethyl Phthalate Absorption | Oil base perfume absorption | Water soluble perfume absorption |
|---|---|---|---|
| (Cellulose Acetate) | Excellent | Excellent | Poor. |
| (Polystyrene) | Good | do | Do. |
| (Acrylic) | do | Good | Do. |
| (Acrylonitrile Styrene copolymer) | Very good | Very good | Do. |
| (Cellulose Acetate Butyrate) | Fair | Good | Do. |
| (Styrene-methyl Methacrylate Copolymer) | Good | Very good | Do. |
| (Cellulose Propinate) | Fair | Fair | Do. |

A consideration of the above will indicate that the invention provides a means for producing a perfume releasant which is easily packed and handled, and is not fragile or does not require the use of fragile containers. It will be seen that the device does not require the use of camphor, napthalene, or paradichlorobenzene, and it is found that the blocks constructed according to the above embodiments do not disintegrate, and are in themselves odorles and non-poisonous. Furthermore they can be re-used if this is desired.

What I claim is:

1. A liquid absorbent and vapour releasant block of compressed cellulose acetate granules formed by the method of mixing 1360 parts by weight of cellulose acetate granules with from 30 to 1400 parts by weight of ethylene glycol monoethyl ether, said cellulose acetate granules having a mean minimum dimension of not less than 0.5 millimeter, adding from 20 to 400 parts by weight of calcium carbonate and further mixing, transferring to a pelleting press and pressing into a block having from 2% to 20% porosity, oven drying said block, imersing said block in an oil based perfume liquid, and removing surplus perfume liquid from the block surface by spin drying.

2. A liquid absorbent and vapour releasant block of compressed cellulose acetate granules formed by the method of mixing 1360 parts by weight of cellulose acetate granules with from 30 to 1400 parts by weight of ethylene glycol monoethyl ether, said cellulose acetate granules being of from 0.5 millimeter to 4.0 millimeter in diameter and from 1½ millimeters to 4½ millimeters in length, adding from 20 to 400 parts by weight of calcium carbonate and further mixing, transferring to a pelleting press and pressing into a block under a pressure of from 300 to 4000 kilogrammes per square centimeter, and oven drying said block at a temperature not exceeding 90° C.

3. A liquid absorbent and vapour releasant block of compressed cellulose acetate granules formed by the method of adding to 1360 parts by weight of cellulose acetate granules approximately 250 parts by weight of ethylene glycol monoethyl ether, said cellulose acetate granules being of from 1 millimeter to 2 millimeters in diameter and from 1½ millimeters to 4½ millimeters in length, mixing in a rotary mixer for approximately 15 minutes, adding about 28 parts by weight of calcium carbonate and further mixing in said mixer for approximately five minutes, transferring to a pelleting press and pressing into a block under a pressure of about 500 kilogrammes per square centimeter, oven drying said block at a temperature of about 66° C. for about 24 hours, immersing said block in a mixture of oil based perfumes and dimethyl phthalate, and removing surplus liquid from the block surface by spin drying.

References Cited by the Examiner

UNITED STATES PATENTS

| | | | |
|---|---|---|---|
| 1,099,961 | 6/1914 | Barton | 252—259.5 X |
| 2,072,226 | 3/1937 | Stricker | 252—259.5 X |
| 2,297,248 | 9/1942 | Rudolph | 264—123 X |
| 2,460,376 | 2/1949 | Caprio et al. | |
| 2,465,470 | 3/1949 | Omohundro et al. | |
| 3,055,297 | 9/1962 | Leeds. | |

ALBERT T. MEYERS, *Primary Examiner.*

JULIUS GREENWALD, *Examiner.*

H. B. GUYNN, *Assistant Examiner.*